March 18, 1969  N. L. STAUFFER ET AL  3,434,158

FIBER OPTICS CATHODE-RAY TUBE RECORDER

Filed Feb. 7, 1967

INVENTORS.
NORMAN L. STAUFFER
DONALD E. SHAFER
TOMMY N. TYLER
BY
M. Michael Carpenter
ATTORNEY.

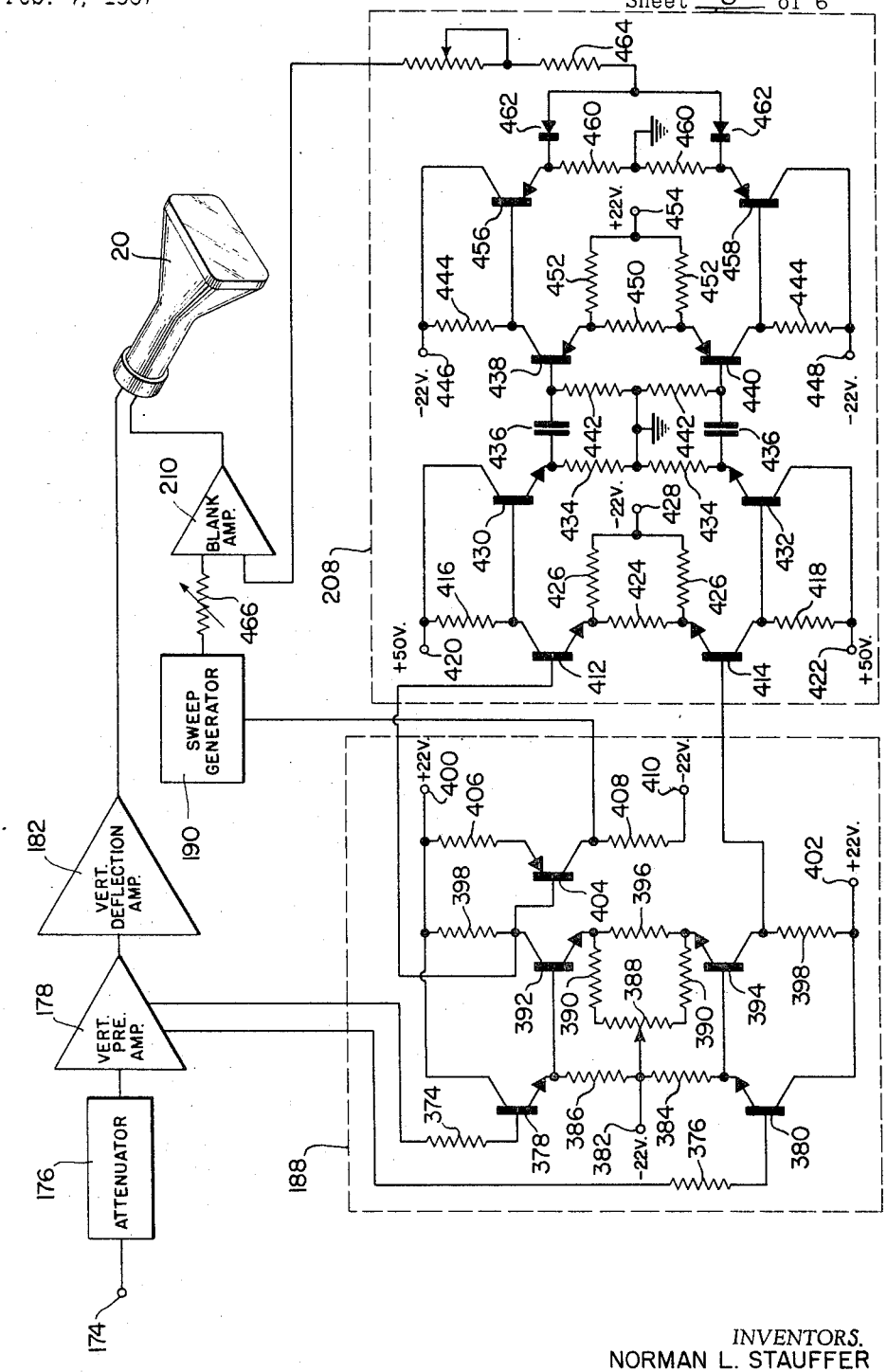

3,434,158
FIBER OPTICS CATHODE-RAY TUBE RECORDER
Norman L. Stauffer, Englewood, and Donald E. Shafer and Tommy N. Tyler, Littleton, Colo., assignors to Honeywell Inc., Minneapolis, Minn., a corporation of Delaware
Filed Feb. 7, 1967, Ser. No. 614,448
U.S. Cl. 346—110                                10 Claims
Int. Cl. G01d 9/42

ABSTRACT OF THE DISCLOSURE

A fiber-optics cathode-ray tube is used to produce an electromagnetic radiation having a predominant wavelength which strikes a recording medium ultrasensitive to that wavelength. The recording medium is continuously drawn past the face plate of the fiber-optics cathode-ray tube in slidable contact with the surface thereof, while a high frequency input signal is transversely and continuously displayed on the face plate of the tube for exposing the recording medium and forming a recording trace thereon. A skew correction circuitry provides an electrical signal for offsetting each transversely displayed recording trace and thereby compensates for the continuous motion of the recording medium. This free running recording trace allows the intensity of the electron beam to be initially increased as it does not retrace its path across the face plate. The rate of change of the high frequency input signal is determined and applied to the control grid for increasing the electron beam intensity in proportion to the writing velocity of the input signal. This arrangement thus provides for a high speed continuous recording of a high frequency input signal which may be immediately displayed upon the recording medium.

---

The present invention relates to a recording apparatus; and, more particularly, to an oscillographic recording apparatus having a fiber-optics cathode-ray tube contacting a radiation sensitive recording medium which is drawn past the face plate of the cathode-ray tube for continuously recording and immediately displaying high frequency input signals thereon.

The cathode-ray tubes presently known in the art are capable of displaying high frequency input signals; but the presently known devices for permanently recording these high frequency signals are generally inadequate. The high frequency recording devices which are available are in the order of two or three magnitudes slower than the available cathode-ray tube devices for displaying them. For example, there are many devices known in the art which utilize a lens system and photographic film for capturing a high frequency signal upon the film as the signal is swept across the face plate of the cathode-ray tube. These systems are limited by the amount of radiation which actually reaches the photographic film. That is, they can not properly record a high frequency rapidly moving trace as not enough of the radiation which is produced by the trace reaches and properly exposes the film. Further, these systems are capable of recording but a single sweep of the cathode-ray tube; and the information thus recorded is not immediately available for study as the photographic film must first be developed. Therefore, a need still exists for a high frequency recording apparatus capable of continuously recording and immediately displaying an input signal.

Another recording approach which is known in the prior art utilizes a cathode-ray tube for projecting an electron beam, in response to an input signal, upon a recording medium thereby exposing a portion of the medium and recording the input signal. The exposed portion of the recording medium becomes electrostatically charged for attracting a toner which marks the charged area. The toner formed trace may then be fixed by heat or other suitable means. This process of recording, while capable of continuous recording, is not capable of immediately displaying the recorded signal. Further, this process is not responsive enough to record at the high speeds necessary for recording the high frequency signals which can be obtained from a cathode-ray tube presently known in the art.

Existing devices for permanently recording input signals, such as oscillographic galvanometer type recorders, drive a radiation sensitive recording medium past an area where a source of radiation is focused upon that recording medium. The input signal causes the galvanometer to deflect the focused radiation source upon the radiation sensitive recording medium for exposing the surface thereof and forming a recording trace thereon. These prior art oscillographic recorders draw the recording medium past the focusing area at a speed in the order of 100 to 200 inches per second, and the recording trace is formed thereon at an equivalent writing speed in the order of 50,000 inches per second. Through the unique arrangement of the present invention the effective speed of the recording medium may be increased to the order of 40,000 inches per second, while the writing speed is correspondingly increased to the order of 4,000,000 inches per second.

Accordingly, an object of the present invention is to provide a recording apparatus which is capable of continuously recording at high speeds a high frequency input signal and which is further capable of immediately displaying that signal permanently upon a recording medium.

Another object of the instant invention is to provide a recording apparatus including a fiber-optics cathode-ray tube which emits electromagnetic radiation and a recording medium which is sensitive to the emitted electromagnetic radiation wherein a good spectral match is established between the response of the recording medium and the emission of radiation from the cathode-ray tube for increasing the recording speed and efficiency of said recording apparatus.

Still another object of this invention is to provide a fiber-optics cathode-ray tube for continuously recording input signals having a maximum frequency in the order of two or three magnitudes higher than the highest frequency which previously could be recorded by prior art recording apparatus.

Yet another object of the present invention is to provide a transverse recording apparatus including a fiber-optics cathode-ray tube whose electron beam is vertically offset to correct for skew, relative to the motion of the recording medium associated therewith, for retaining the recorded trace thus formed in a normal relationship with the longitudinal motion of the recording medium regardless of the velocity of said medium.

A further object of the invention described herein is to provide a high frequency oscillographic recording apparatus which will continuously record an input signal as long as the signal is present; but which will terminate the motion of the recording medium, in the absence of that input signal, and automatically place the recording medium in motion upon the return of said input signal.

A still further object of the instant invention is to provide a high frequency fiber-optics cathode-ray tube recording apparatus with a unique means for automatically increasing the intensity of the electron beam in direct proportion to the trace velocity due to the input signal thereby increasing the recording speed of the recording apparatus.

Other objects and many of the attendant advantages of the present invention will become readily apparent to those skilled in the art as a better understanding thereof is obtained by reference to the following description when considered in connection with the accompanying drawings, wherein:

FIG. 9 is a schematic representation of the circuitry for automatically adjusting the intensity of the electron beam in direct relationship to the trace velocity due to the high frequency input signal.

The recording apparatus of the present invention utilizes a fiber-optics cathode-ray tube for emitting electromagnetic radiation of a predetermined wavelength. A recording medium which is ultrasensitive to the predetermined wavelength is pressed against a face plate of the cathode-ray tube by a platen thereby positioning the medium to receive the electromagentic energy from the cathode-ray tube. The upper portion of the platen mounts an idler roller which engages a pressure roller for pinching the recording medium therebetween. The pressure roller is connected through a belting arrangement to a drive motor which provides the driving force for drawing the recording medium continuously over the face plate of the cathode-ray tube. An input signal applied to the fiber-optics cathode-ray tube through suitable amplifying networks causes an electron beam generated therein to sweep across the inner surface of the face plate for actuating a phosphor thereon and causing the emission of electromagnetic radiation. This radiation passes through the fiber-optic bundles within the face plate and forms a recording spot which strikes the radiation sensitive surface of the recording medium adjacent thereto for forming a corresponding recording trace on the recording medium. The electron beam is vertically deflected as it sweeps across the face plate for skewing the recording spot thus formed and forming the recording trace transversely upon the recording medium in a normal relationship with the longitudinal motion thereof. The electron beam is also amplified, for increasing its current and thereby its intensity, in direct proportion to its velocity due to the input signal. This arrangement provided for a maximum recording intensity during the recording of a high frequency, high speed, input signal while preventing the beam from burning the phosphor off the inner surface of the face plate during periods of relative low frequency input signals. Through this arrangement the recording of a high frequency input signal is made possible by providing enough radiation to expose the recording medium when required, while damage to the cathode-ray tube is prevented by allowing the electron beam intensity to diminish in the absence of a high frequency input signal.

Figure 1:
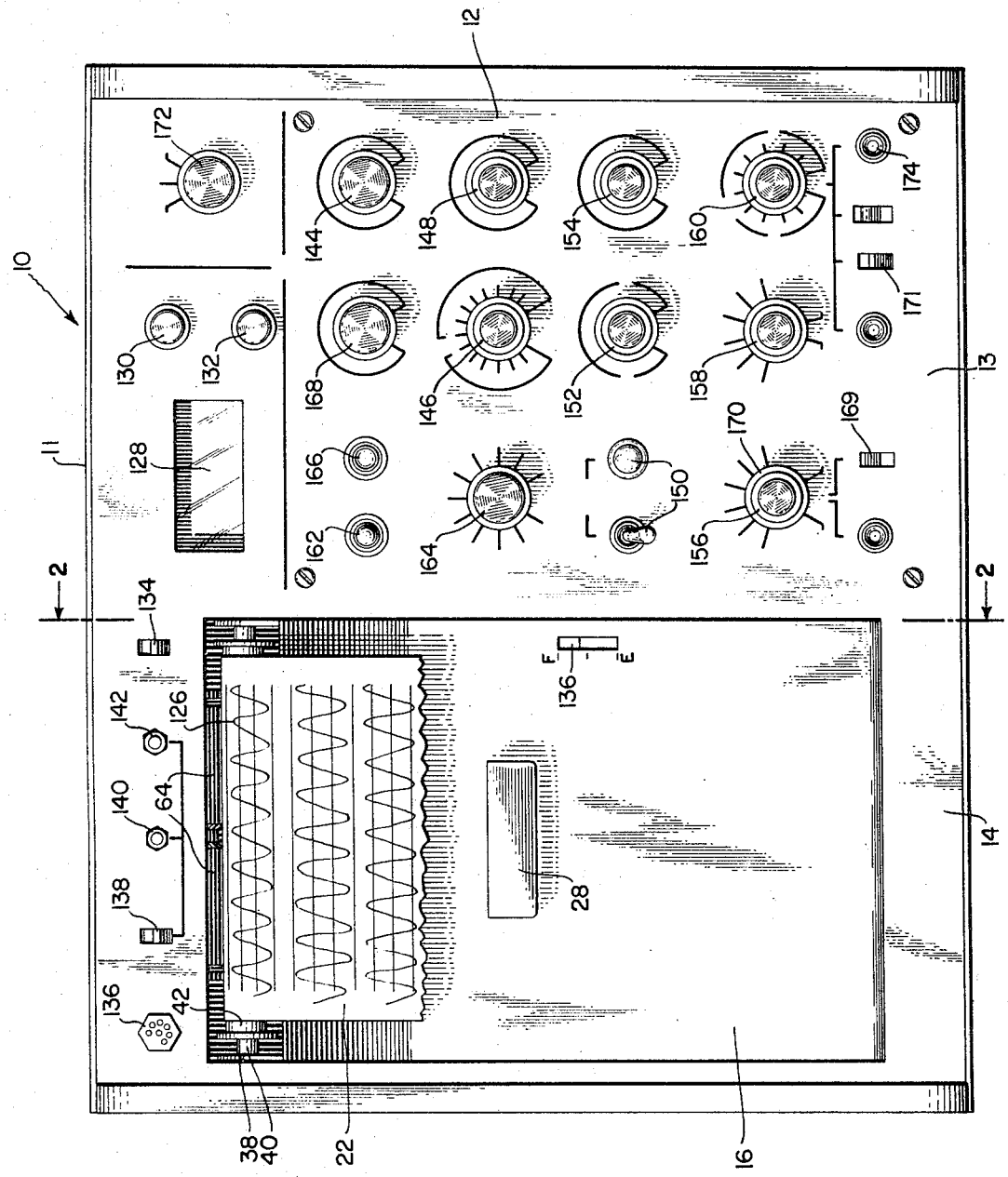
FIG. 1 is a front elevation view, showing the front panel appearance of the recording apparatus of the present invention including: a recording panel having a fiber-optics cathode-ray tube, an electronic control panel, a monitoring cathode-ray tube, and the recording medium.
Figure 2:
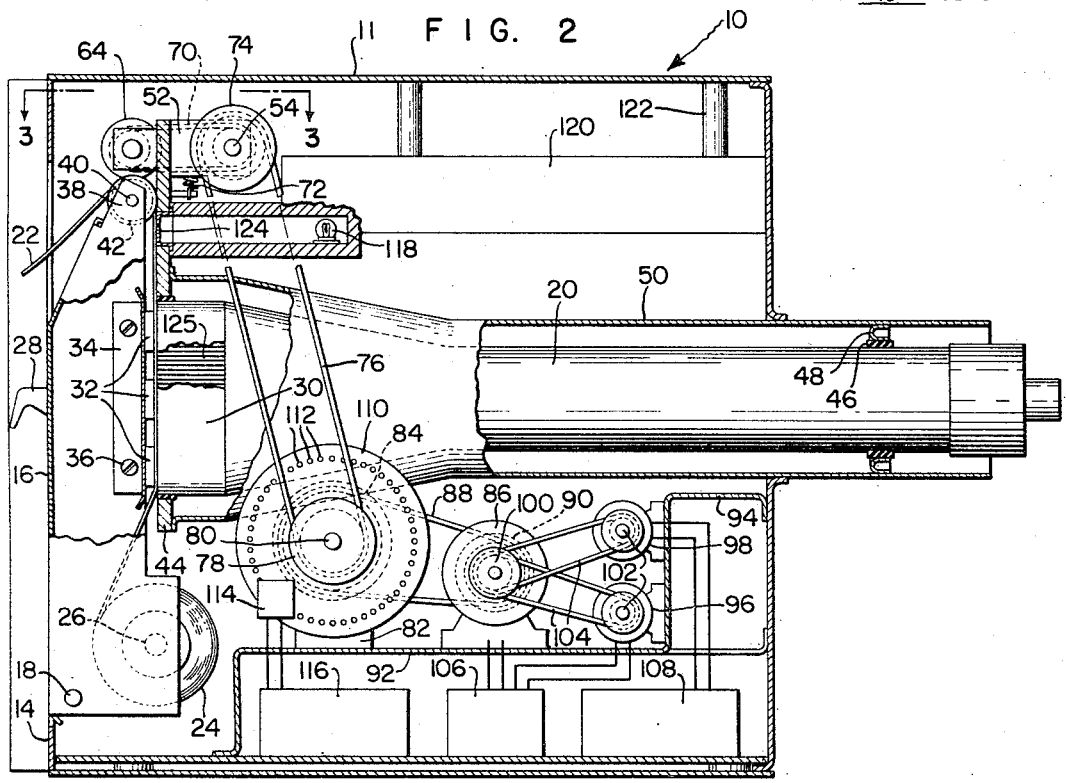
FIG. 2 is a vertical section taken along line 2—2 of FIG. 1, showing the drive mechanism for the recording medium.

Referring now to the drawings, a fiber-optics cathode-ray tube recording apparatus is shown generally at 10, FIG. 1, housed within a main frame 11 which is constructed in the form of a cabinet. A front panel 12 is mounted to the main frame 11 of the recording apparatus, as by screws not shown, and is vertically divided into a control panel 13, on the right-hand side, and a recording panel 14, on the left. The recording panel 14 is provided with an aperture within which a platen 16 is pivotally mounted to swing outwardly about a hinge pin 18 secured in the lower forward portion of the main frame 11. Located behind the platen 16, as best seen in FIG. 2, is a fiber-optics cathode-ray tube 20. A recording medium 22 passes between the fiber-optics cathode-ray tube 20 and the platen 16. The recording medium is insensitive to most electromagnetic radiation but is ultrasensitive to a predetermined wavelength of invisible ultraviolet radiation emitted from the cathode-ray tube. In the present embodiment, the medium is provided in the form of an emulsion coated paper roll 24 rolled upon a rotatably mounted shaft 26 which is located in the lower portion of the platen 16. A handle 28 is arranged on the outer surface of the platen 16 for disengaging the platen from a slight pressure contact against the surface of a face plate 30 associated with the cathode-ray tube 20. The pressure contact retains the recording medium 22 in a slidable friction contact against the surface of the face plate 30. Pressure pads 32, such as felt, establish the pressure contact with the face plate 30 and are mounted upon a mounting plate 34 which is secured to the platen 16 by suitable means, such as a nut and bolt assembly 36. This arrangement allows the adjustment of the pressure pads 32 against the face plate 30 when the platen 16 is in its closed operating position. The pressure pads may be replaced with other suitable means, such as a plurality of stiff bristled brushes. The upper portion of the platen 16 is provided with a pair of upwardly extending end members 38 each having an aperture into which a mounting shaft 40 is introduced for supporting a rubber coated idler roller 42.

A mounting plate 44 is attached to the main frame 11 by screws, not shown. The mounting plate 44 is provided with a generally rectangular opening which is lined with a soft insulating material for receiving the front portion of the cathode-ray tube 20 in edge mounting relationship. The backmost portion of the tube 20 is mounted by a torodial clamping member 46 attached to an insulated collar 48 which is supported within the inner surface of an electromagnetic shield 50. The shield encompasses the cathode-ray tube 20 and is retained in place by an aperture within the back panel of the main frame 11. The recording medium 22 is removed from its roll 24, one layer at a time, and past between the pressure pads 32 and the face plate 30 where it is retained in a slidable friction contact against the surface of the face plate by the pressure pads. The recording medium then passes over the idler roller 42 and exist the recording apparatus.

Figure 3:
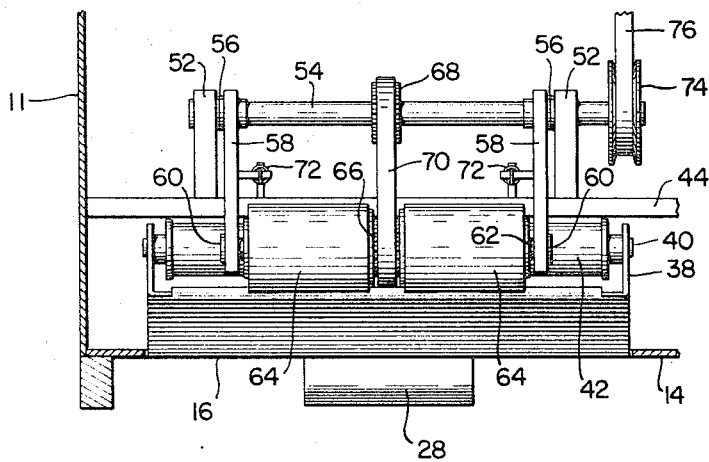
FIG. 3 is a horizontal section taken along line 3—3 of FIG. 2 showing more detail of the drive mechanism.

A driving motion is transmitted to the recording medium 22 by a drive assembly as the medium passes over the idler roller. A pair of mounting blocks 52 are secured to the mounting plate 44, as by screws not shown, and extend back therefrom for rotatably mounting a driven shaft 54 within suitable bearing means 56, FIG. 3. A pair of pressure roller mounting arms 58 are pivotally mounted upon the shaft 54 by a second set of bearing means 56 secured in one end thereof. The ends of the mounting arms 58, opposite from the shaft 54, are provided with apertures into which bearings 60 are fitted for rotatably mounting a pressure roller shaft 62. First and second pressure rollers 64 are mounted upon each end of the roller shaft 62 between the arms 58 and separated by a pulley 66. The pulley 66 is arranged opposite a driving pulley 68 which is fixed to the rotating driven shaft 54, as by set screws not shown. A belt 70 transmits rotational motion from the shaft 54 to the pressure rollers 64. Each pressure roller mounting arm 58 is spring loaded by a spring 72, connecting each arm to the mounting plate 44, for urging the pressure rollers 64 into driving contact with the rubber coated idler roller 42 when the platen 16 is in its closed operative position. A driven pulley 74 is attached, by set screws, to an extended end of the driven shaft 54 for receiving a second belt 76 which provides the driving power to the drive assembly just described. The belt 76 is driven by a transmission pulley 78 mounted upon a transmission unit, to be described hereinbelow. As the platen 16 is closed into its operating position, the idler roller 42 engages the pressure rollers 64, in a camming action, for pinching the recording medium 22 therebetween. Through this arrangement the recording medium 22 is driven past the face plate of the fiber-optics cathode-ray tube 20 and held in a slidable pressure contacting position thereagainst for recording thereon.

The transmission pulley 78 mounts on a transmission output shaft 80 of a transmission unit 82. The transmission unit 82 may be one of several types known in the art. For example, in the present embodiment, there is provided a multiple clutch unit having an input and output shaft connected through a plurality of gears which may be selectively connected by energizing the clutches for obtaining a varying series of rotational output levels. A pulley 84 is mounted on the transmission input shaft, not shown, and rotatably connected to a drive motor 86 by a belt 88 and a drive motor pulley 90 mounted on the motor shaft. The drive motor 86 is a D.C. shunt motor driven by a silicon controlled rectifier circuit to be described in greater detail hereinbelow with reference to FIGS. 7 and 8. A motor mounting bracket 92 mounts within the lower portion of the main frame 11, as by screws, for supporting the motor 86, the transmission unit 82, and forming a mounting area for the electronics associated therewith. A second bracket 94 mounts on the top of the motor mounting bracket 92 and the back panel of the main frame 11 for mounting a pair of tachometers, 96 and 98. Each tachometer, 96 and 98, is driven by the motor 86 through a motor pulley 100, mounted on the motor shaft; a second pulley 102, mounted on each tachometer; and a pair of belts 104. Each tachometer is thereby driven through a 3:1 set-up ratio from the motor 86 for producing an electrical potential level which increases in direct proportion with motor speed.

The first tachometer 96 is electrically connected to a motor drive servo circuitry 106. The circuitry utilizes the potential level established by the tachometer 96 and applies it through an attenuation network to an amplifier for varying the length of time that a silicon controlled rectifier is turned on, thereby adjusting the speed of the shunt motor 86. This circuitry will be described in greater detail hereinbelow with reference to FIGS. 7 and 8.

The second tachometer 98 is connected to a skew correction circuitry 108. The potential level established by the tachometer 98 is attenuated and applied through an operational amplifier for establishing the slope of the sawtooth output signal therefrom. This signal is applied to a summing junction and then to a vertical deflection amplifier for adjusting the input signal in relation to the speed of the recording medium. This circuit and its functions will be described in greater detail hereinbelow with reference to FIGS. 5 and 6.

A disk 110 mounts on the transmission output shaft 80, by set screws not shown. The disk is provided with a plurality of evenly spaced apertures 112 located about a common circumference on the outer periphery thereof. A lightsource and a photoelectric cell, shown schematically at 114, are positioned on opposite sides of the disk 110 such that radiant energy from the light source passes through each aperture 112 and falls upon the photoelectric cell as the disk 110 rotates. This arrangement provides a frequency signal which varies directly with the linear speed of the recording medium 22. The frequency signal is fed to a reference line circuit 116 where it is amplified and applied to a source of electromagnetic energy 118 mounted within a reference line module 120. The reference line module 120 is secured within the main frame 11, as by standoffs 122 which may be attached to the inner surface of an upper panel of the main frame. The front portion of the reference line module 120 is provided with a mask 124 having a width substantially equal to the width of the recording medium 22 and having a plurality of vertically arranged slits equally spaced along a single horizontal slit therein. The mask 124 is in juxtaposition with the idler roller 42 which retains the recording medium 22 in sliding contact against the outer surface thereof.

The circumstance of the idler roller 42 is established at 10 centimeters whereby one revolution thereof advances the recording medium by an equal amount. The circumference and spacing of the apertures 112 within the disk 110 are arranged such that one aperture passes between the light source and photoelectric cell 114 for each centimeter that the recording medium 22 advances. The electrical signal thus produced is amplified for lighting the electromagnetic energy source 118 and focusing the radiation therefrom onto the recording medium 22. In this manner, a reference line is formed upon each centimeter of the advancing recording medium regardless of the acceleration, velocity, or deceleration thereof.

The fiber-optics cathode-ray tube 20 and its associated face plate 30 must be constructed with exceptional care. The conventional cathode-ray tube is constructed from a single glass envelope. However, in a fiber-optics cathode-ray tube, the face plate contains a plurality of fiber-optic bundles, shown schematically at 125. Due to the pressure of these bundles 125, the cathode-ray tube can not be constructed from a single glass envelope. Further, since the fiber-optic bundles are constructed from a fiberous material having physical properties which differ from the glass forming the remainder of the tube, the face plate must be designed to compensate for the physical differences. An example of one such difference is the reduced strength of the transparent fibers, thus requiring the thickness of the face plate to be greater than the glass thickness of the tube body. The face plate 30 consists of millions of tiny transparent fibers, each 10 to 15 microns in diameter, which are embedded within the full surface thereof and arranged at right angles thereto. The inner surface of the face plate 30 is coated with a phosphor whose cathodoluminescence causes the release of electromagnetic radiation having a maximum concentration of wavelengths equalling the wavelengths to which recording medium is ultrasensitive. Although many combinations of phosphor and recording medium sensitivity may be utilized, the ultraviolet range is especially useful. In this range the radiation from artificial or natural light has little effect upon the light sensitive recording medium 22. This allows for the handling and loading of the recording medium without the danger of pre-exposing it during these operations. In the present embodiment, a phosphor having a maximum luminescence at a wavelength of 3850 angstroms has been found most desirable as it provides a spectral match with the recording medium 22, whose maximum radiation sensitivity also occurs at 3850 angstroms. An example of a phosphor having the desired characteristic is P–16. The unique combination of the precise spectral match, between the recording medium 22 and the phosphor, and the efficient coupling of the radiation, from the phosphor through the fiber-optics to the recording medium, provides an efficient means for continuously recording a high frequency input signal upon a recording medium which may be immediately displayed.

In the recording apparatus thus described, an input signal causes the fiber-optics cathode-ray tube 20 to sweep an electron beam across the inner surface of the face plate 30. As the electron beam strikes the phosphor upon the inner surface of the face plate 30, the resulting emission of the electromagnetic radiation is transmitted through the adjacent transparent optical fiber and falls upon the recording medium 22 pressed against the other end thereof. The electromagnetic radiation thus exposes that portion of the radiation sensitive recording medium adjacent to the transparent fiber for forming a transverse trace 126 thereon. Due to the continuous motion of the recording medium 22 past the face plate 30 of the fiber-optics cathode-ray tube 20, the recording trace 126 would be skewed upon the recording medium in the absence of a skew correction. Skew correction, therefore, is provided for offsetting the electron beam as it is transversely swept across the inner surface of the face plate 30. The amount of skew correction is determined by the instantaneous speed at which the recording medium is drawn past the face plate 30 and is automatically adjusted for retaining the transverse trace 126 perpendicular to the motion of the recording medium, along the longitudinal axis thereof, regardless of the velocity of that motion. This arrangement will be described hereinbelow in greater detail.

The transverse trace thus formed becomes visible after a final development by a latensification process wherein the latent image of the trace is made into a permanent record by exposing it to a strong ambient light, as from a fluorescent light. In a less desirable form the trace could be made immediately visible but the arrangement of the present embodiment provides for the forming of reference lines upon the recording medium 22 before the medium passes over the idler roller 42 for exposing the trace to the view of an operator. Therefore, a second monitoring cathode-ray tube 128 is provided for immediate viewing of an input signal and to provide a visual aid when adjusting the fiber-optics cathode-ray tube 20 during a period of initial instrument adjustment. This eliminates the need to operate the drive mechanism during warm up to initially adjust the various controls.

The controls, FIG. 1, for the monitoring cathode-ray tube include intensity 130 and focus 132. The reference lines are controlled, either on or off, by a switch 134. An indicator 136 on the platen 16 indicates the amount of paper remaining on the roll 24. A plug 136 is provided for supplying the electrical power to the latensifying lamp, not shown. A record number system including an on-off switch 138, a reset switch 140, and an advance switch 142 is provided for recording a characterizing reference number upon the recording medium 22 for each time the medium is drawn past the fiber-optics cathode-ray tube. These controls in combination with the platen 16 complete the recording panel 14.

The control panel 13 includes the monitoring cathode-ray tube 128 and its intensity and focus controls 130 and 132, discussed hereinabove. It also includes controls for astigmatism 144, sweep timing 146, intensity and focus 148, power 150, trigger level and stability 152, horizontal and vertical position 154, calibration level 156, trigger slope and coupling 158, and vertical sensitivity 160. These controls are commonly found in many commercially available standard laboratory D.C. oscilloscopes. The control panel 13 further includes a control switch 162, for turning on the drive mechanism or placing it momentarily in a driving arrangement; a speed selection switch 164; a single sweep switch 166, for forming a single recording trace 126 upon the recording medium; a sweep spacing adjustment 168; an automatic drive switch 169, a record overrun adjustment 170; an automatic amplitude compression control 171; and a switch 172 for actuating the skew correction of the recording apparatus 10. These controls are peculiar to the recording apparatus of the present invention and will be described in more detail hereinbelow.

Figure 4:
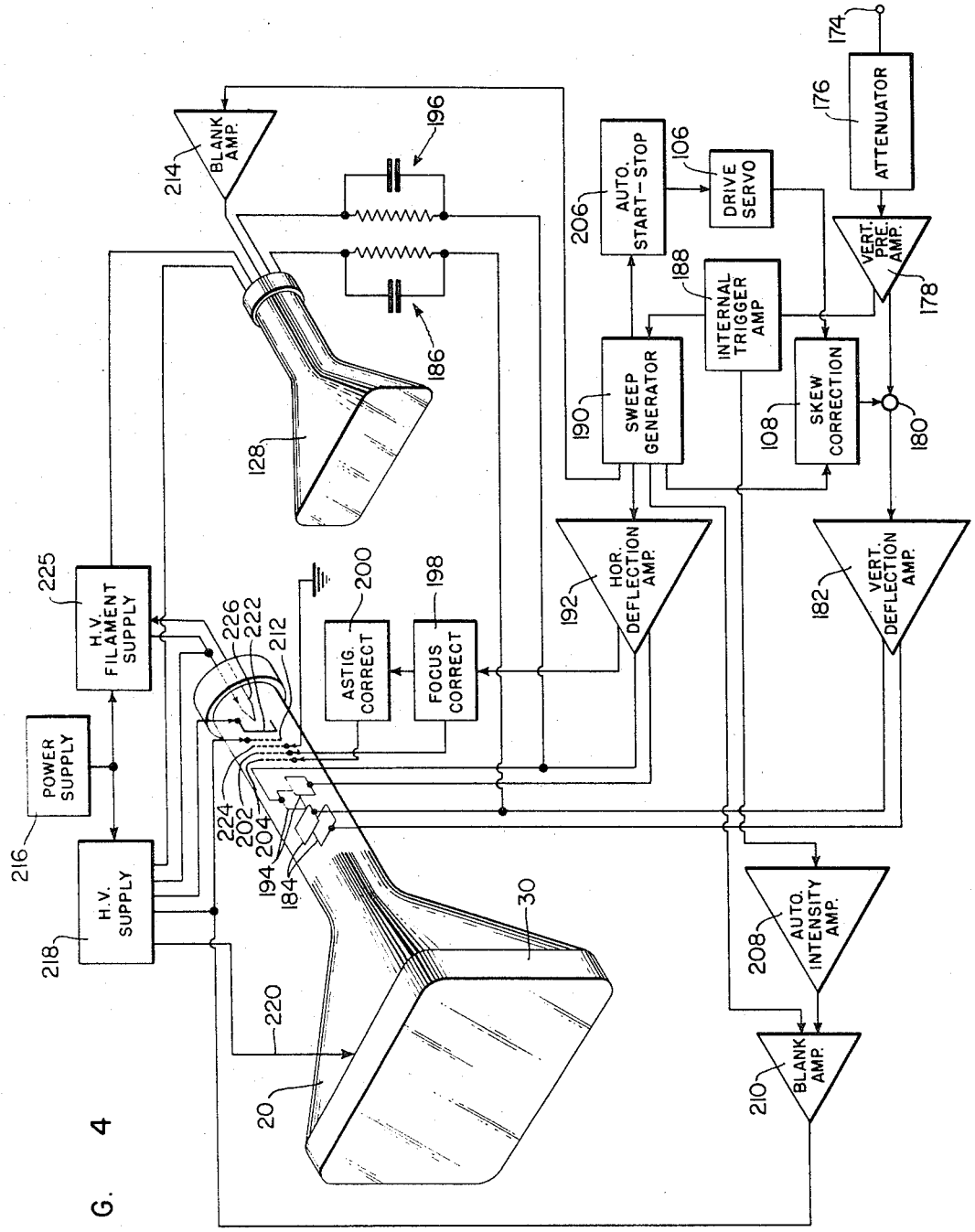
FIG. 4 is a schematic diagram illustrating the electrical circuitry of the recording apparatus.

Referring now to FIG. 4, a high frequency input signal, in the order of one megahertz, is introduced into the recording apparatus at an input terminal 174 and then into an attenuating circuit 176 before being fed to a vertical preamplifier 178. From the vertical preamplifier 178 the input signal is applied to a summing junction 180 and then to a vertical deflection amplifier 182, the output of which is utilized to provide the potential between a pair of vertical deflection plates 184 within the fiber-optics cathode-ray tube 20. The output of the vertical deflection amplifier is attenuated through a resistor-capacitor network 186 and fed to the monitoring cathode-ray tube 128 which is slaved to the fiber-optics cathode-ray tube 20. The input signal from the vertical preamplifier 178 is also introduced into an internal trigger amplifier 188 from which it is then applied to a sweep generator 190. The trigger amplifier 188, in combination with the sweep generator 190, provides a signal to a horizontal deflection amplifier 192 which is amplified and applied across a pair of horizontal deflection plates 194, within the fiber-optics cathode-ray tube 20, for swinging the electron beam transversely across the inner surface of the face plate 30. The output signal from the horizontal deflection amplifier is attenuated through a resistor-capacitor network 196 and introduced into the monitoring cathode-ray tube 128. A second output signal from the horizontal deflection amplifier 192 is serially connected with a focus correction circuitry 198 and an astigmatism correction circuitry 200. These circuits, in turn, are connected to separate control grids 202 and 204, respectively, within the fiber-optics cathode-ray tube 20.

The sweep generator circuit 190 provides a signal to an automatic start-stop circuit 206 which is connected to the drive servo circuitry 106. The drive servo circuitry will be described in greater detal hereinbelow with reference to FIGS. 7 and 8. The automatic drive switch 169 is provided on the control panel 13 for energizing the automatic start-stop circuitry 206. In the energized stage, a high frequency input signal applied to the input terminal 174 causes the sweep generator 190 to produce a signal for application to the automatic start-stop circuitry 206. This signal, in turn, energizes the drive servo circuitry 106 for starting the driving motor 86 and drawing the recording medium 22 past the face plate of the fiber-optics cathode-ray tube 20. As the drive servo circuitry becomes energized, the output of the tachometer 98, also driven thereby, is supplied to the skew correction circuitry 108. The output of the skew correction circuitry 108, in turn, is connected to the summing junction 180; and this circuitry applies a current to the summing junction for correcting the input signal as it is applied to the vertical deflection amplifier 182. In this manner, the input signal is offset upon the face plate of the fiber-optics cathode-ray tube 20 in direct and instantaneous proportion to the speed at which the recording medium is being driven thereby. Through this combination, the recording medium 22 may be accelerated and decelerated by the automatic start-stop circuit 206 while the recording trace 126 is retained normal to the longitudinal motion of the recording medium. The automatic start-stop circuitry is further arranged to stop the driving motor 86 in the absence of an input signal. The time period between the abatement of the input signal and the stopping of the driving motor 86 is adjusted on the control panel 13 by the record overrun adjustment 170. This arrangement allows the recording apparatus 10 to save paper and also allows it to be operated with a minimum of operator supervision. Such a device could be utilized as a monitor for power transmission lines or power generating stations. The high frequency recording ability of the apparatus would be ideally suited for studying the effect of lightning upon these systems.

As the high frequency input signal is applied to the input terminal 174, the internal trigger amplifier also applies this signal to an automatic intensity amplifier 208. The automatic intensity amplifier 208 functions to increase the electronic beam current in direct proportion to the changing potential caused by the high frequency input signal which appears across the vertical deflection plates 184. In this manner, the recording spot intensity, produced by the electron beam, is not maintained at a constant level upon the surface of the face plate 30; but it is increased in direct proportion to an increase in beam velocity due to the high frequency input signal. The sweep generator 190 provides an output signal to a blanking amplifier 210. The sweep generator 190 includes an adjustable resistive network controlled by the sweep timing switch 146 for initially adjusting the nominal electron beam current as a function of the transverse velocity of the sweep. This arrangement will be described in greater detail with reference to FIG. 9. The output of the automatic intensity amplifier 208 is also connected to the blanking amplifier 210 and the output of the blanking amplifier is applied to a control grid 212 within the fiber-optics cathode-ray tube 20. Through this arrangement, the output of the automatic intensity amplifier is removed from the cathode-ray tube during the flyback time when the electron beam is returned to its starting position by the horizontal deflection amplifier. The sweep generator 190 also provides an output signal to a second blanking amplifier 214 which functions to terminate the electron beam during the flyback time of the monitoring cathode-ray tube 128.

A power supply 216 is connected to a high voltage supply 218 which provides a positive potential, in the order of +5000 volts D.C., to the anode 220 of the fiber-optics cathode-ray tube and provides a negative potential, in the order of —2500 volts D.C., to the cathode 222 thereof. The high voltage supply 218 also provides a potential to the control grid 212 which is controlled by the blanking amplifier 210. A fourth control grid 224 is provided and is connected to a reference potential, such as ground. The power supply 216 is also connected to a high voltage filament supply 225 which, in turn, powers the heater 226 of the fiber-optics cathode-ray tube.

Figure 5:
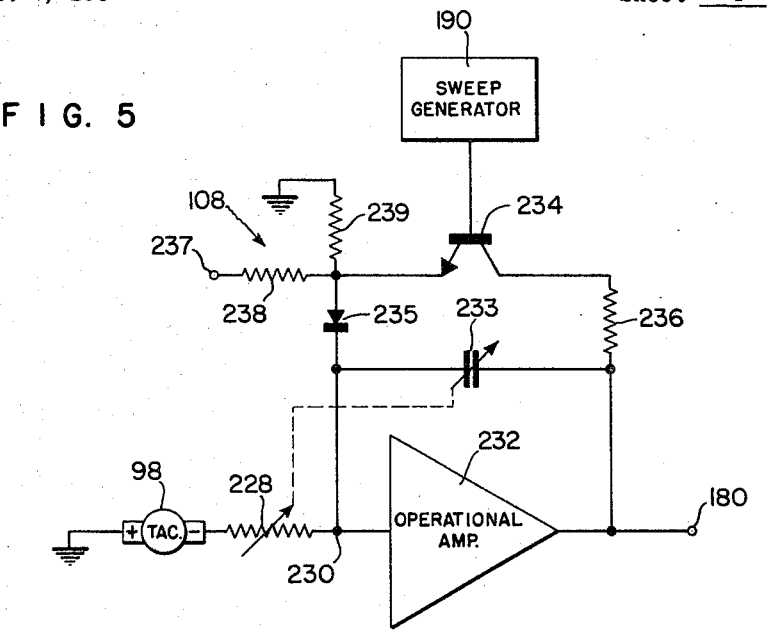
FIG. 5 is a schematic representation of the circuitry which adjusts the electron beam for skew correction.

The skew correction circuitry 108 is shown in detail in FIG. 5. The tachometer 98 is connected with its positive output terminal to ground, while its negative output terminal is connected through an adjustable resistor 228 to a summing junction 230. The adjustable resistor 228 is controlled by the speed selection switch 164 on the control panel 13. The summing junction 230 is connected to the input of an operational amplifier 232 and one electrode of an adjustable capacitor 233. The output of the operational amplifier 232 is connected to the summing junction 180 which is connected to the vertical deflection amplifier 182. The second electrode of the adjustable capacitor 233 is also connected to the output of the operational amplifier 232. The adjustable resistor 228 and adjustable capacitor 233 are commonly adjusted. An NPN transistor 234 is connected across the capacitor 233 having its emitter connected to the anode of a diode 235 and then to the summing junction 230. The collector of the transistor 234 is connected to a common node between the output of the operational amplifier and the electrode of the capacitor 233 through a resistor 236. The output from the sweep generator 190 is connected to the base of the transistor 234. The emitter of the transistor is also connected to a source of negative potential supplied at terminal 237 through a resistor 238 and to ground through a resistor 239.

Figure 6:
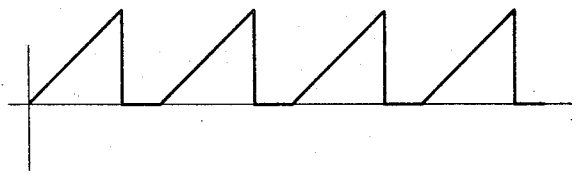
FIG. 6 is a curved showing the skew correction wave form produced by the circuitry of FIG. 5.

In operation, a signal from the sweep generator, corresponding to the flyback of the electron beam within the fiber-optics cathode-ray tube, energizes the transistor 234 causing it to conduct and short the capacitor 233. After flyback, the output from the tachometer 98 passing through the adjustable resistor 228 is applied to the summing junction 230 where the current caused by the output is integrated by the operational amplifier 232 and the adjustable capacitor 233 for determining the slope of a sawtooth wave form, as shown in FIG. 6. Upon application of the signal from the sweep generator 190, the capacitor 233 is discharged and the output of the operational amplifier 232 reduced to its predetermined reference level. The skew correction signal thus becomes a sawtooth wave form applied to the summing junction 180. This signal is summed with the amplified input signal, also applied thereto, and fed into the vertical deflection amplifier 182 for vertically displacing the electron beam upon the face of the fiber-optics cathode-ray tube in proportion to the instantaneous velocity of the recording medium 22. This arrangement retains the recording trace 126 normal to the longitudinal motion of the recording medium regardless of the accleration, velocity, or deceleration thereof.

Figure 7:
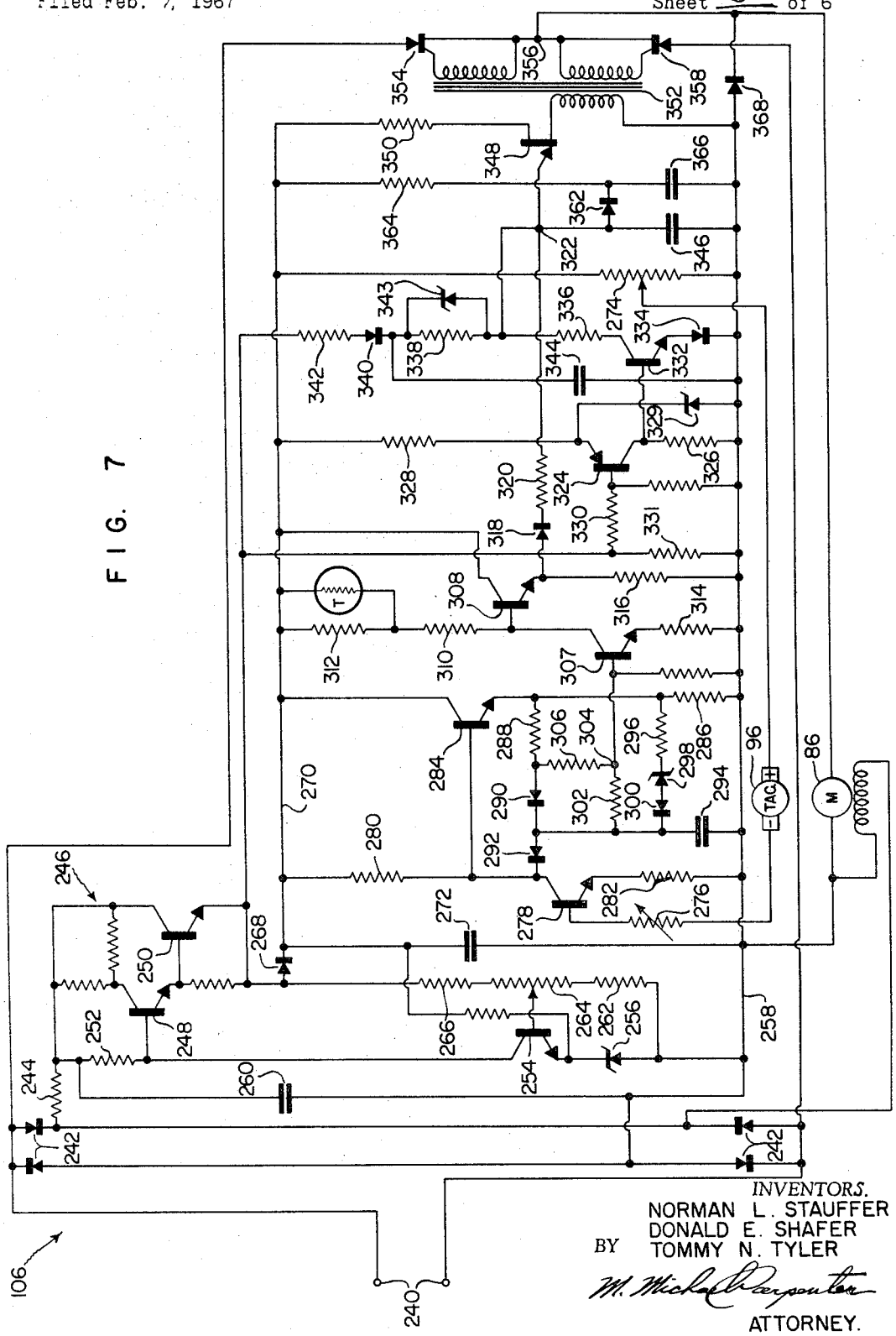
FIG. 7 is a schematic representation of the circuitry of the motor drive mechanism of the recording apparatus.

Referring now to FIG. 7, the details of the motor drive servo circuitry 106 will be enumerated. A pair of input terminals 240 provide A.C. line current to a diode bridge formed from diodes 242. The output of the rectifier bridge is connected through a resistor 244 to a regulator 246 which includes a Darlington pair of transistors 248 and 250. The resistor 244 is connected to the base of the transistor 250. The base of transistor 248 and resistor 252 are commonly connected to the collector of an NPN transistor 254. The emitter of the transistor 254 is connected to the cathode of a Zener diode 256, the anode thereof being connected to a source of common reference potential provided by a line 258. The line 258 connects to the negative node of the bridge formed by diodes 242. A filtering capacitor 260 is connected between resistors 244 and 252 and the reference potential line 258. The anode of the Zener diode 256 also connects through a resistor 262 to the slidewire of a potentiometer 264. The slide arm of the potentiometer 264 is connected to the base of the resistor 254, while the second terminal of the slidewire thereof connects through a resistor 266 to the output of the voltage regulator 246 at the emitter of the transistor 250. The output of the voltage regulator 246 is also connected to the anode of a diode 268 whose cathode is connected to a positive potential line 270. One electrode of a capacitor 272 connects to the positive potential line 270, while its second electrode connects to the reference potential line 258. An adjustable potentiometer 274 is also connected between the lines 270 and 258 through the slidewire thereof. The wiper arm of the potentiometer 274 connects to the positive output terminal of the tachometer 96 while the negative output terminal thereof connects through an adjustable resistor 276 to the base of an NPN transistor 278. The adjustable resistor 276 is adjusted by the adjustment of the speed selection switch 164 on the control panel 13.

The collector of the transistor 278 is connected to the positive potential line 270 through a resistor 280, while the emitter thereof connects to the reference potential line 258 through a resistor 282. A second transistor 284 is arranged with its base connected to the collector of the transistor 278 and its collector connected to the line 270. The emitter of the transistor 278 is connected to the line 258 through a resistor 286. A resistor 288 connects between the emitter of transistor 284 and the anode of a diode 290 having its cathode serially connected to the anode of a second diode 292 whose cathode, in turn, connects to the collector of the transistor 278. An electrode of a capacitor 294 is connected between the diodes 290 and 292 and the reference potential line 258. A resistor 296 is serially connected between the emitter of transistor 284 and the cathode of a Zener diode 298 whose anode is connected to the anode of a diode 300. The cathode of the diode 300 is connected to a node between the diodes 290 and 292 and the capacitor 294. A resistor 302 connects this same node to a summing junction 304, while a second resistor 306 connects from the summing junction 304 to a node between the anode of the diode 290 and the resistor 288.

The summing junction 304 connects to the base of an NPN transistor 307 whose collector is connected to the base of a second NPN transistor 308 thus forming an emitter follower configuration. The collector of the transistor 308 is connected to the positive potential line 270 while the collector of the transistor 307 connects thereto through a pair of serially connected resistors 310 and 312. The emitters of the transistors 307 and 308 are connected by resistors 314 and 316, respectively, to the reference potential line 258. The output of the amplifying network formed by the transistors 307 and 308 is connected from the emitter of transistor 308 through a diode 318 and a resistor 320 to a summing junction 322. A PNP transistor 324 is connected between the referenced potential line 258 and the positive potential line 270 and by resistors 326 and 328, respectively. A Zener diode 329 connects between the emitter of transistor 324 and the reference potential line 258. The base of the transistor 324 connects through a resistor 330 to the emitter output of transistor 250 within the regulator 246. A resistor 331 joins a node between the resistor 330 and the emitter of transistor 250 to the reference potential line 258. The collector of the transistor 324 connects to the base of an NPN transistor 332 whose emitter connects to the anode of a diode 334 which is, in turn, connected to the reference potential line 258. The collector of a transistor 332 serially connects through a resistor 336, a second resistor 338, a diode 340, and a third resistor 342 to the emitter, of the transistor 250 within the regulator 246. A capacitor 344 connects from a node, between the cathode of diode 340 and the resistor 338, to the reference potential line 258. A node between the serially connected resistors 336 and 338 is connected to the summing junction 322. A second Zener diode 343 is connected between these nodes. The summing junction 322 is connected through a capacitor 346 to the reference potential line 258 and is also connected to the emitter of a unijunction transistor 348. The second base of the unijunction transistor 348 connects through a resistor 350 to the positive potential line 270 while the first base connects to a terminal of a primary winding within a transformer 352. The second terminal of this primary winding connects to the reference potential line 258. A silicon controlled rectifier 354 is provided with its anode connected to a first A.C. terminal 240 and its control electrode connected to a terminal of a secondary winding of the transformer 352. The second terminal of the secondary winding is connected to a junction point 356. The junction 356 also connects to the cathode of the silicon controlled rectifier 354. A second silicon controlled rectifier 358 is provided having its anode connected to the second A.C. terminal 240 and its control electrode connected to a terminal of a second secondary winding within the transformer 352. The second terminal of the second secondary winding connects to the junction 356 which, in turn, connects to the cathode of the silicon controlled rectifier 358. The junction 356 is connected to one terminal of the motor 86. The second terminal of the motor connects to the reference potential line 258. The shunt field winding of the motor 86 is connected between the positive node of the full wave rectifying bridge, formed by diodes 242, and the reference potential line 258 which is connected to the negative node of the bridge.

The motor drive servo circuitry, thus described, comprises a constant velocity servo having its control achieved by comparing the voltage output from the tachometer 96 with a voltage reference established across the adjustable resistance 276 for forming a resulting error signal for motor speed control. The A.C. input voltage is fully rectified by the diodes 242 within the bridge and the referenced to the Zener diode 256. This voltage is amplified through the transistor 254 and regulated by the Darlington pair, formed by transistors 248 and 250. Resistor 252 provides initial regulator turn on current while resistor 264 provides adjustment for establishing the regulator output amplitude. As mentioned hereinabove, the regulator output is provided at the emitter of the transistor 250. The signal at the emitter of transistor 250 appears as a full wave rectified and clipped, but not filtered, wave form.

The output voltage from the tachometer 96 is divided by the adjustable resistance 276 and applied to the base of the transistor 278 after being compared to an opposition voltage established by resistor 274. The resulting error signal is amplified by the transistor 278 to provide a longer or shorter discharge time, as required, for capacitor 294 through the diode 292, transistor 278, and the resistor 282. The emitter follower transistor 284 provides a low impedance output to charge the capacitor 294 rapidly or slowly as necessary for minimized speed overshoot and hunting. When charging the capacitor 294 rapidly the path is through the resistor 296, the Zener diode 298, and the diode 300. When charging the capacitor 294 slowly the path is through the resistor 288 and the diode 290. The signal currents are summed by the resistors 302 and 306 at the summing junction 304 and applied to the base of the transistor 307 and the emitter follower transistor 308. The resulting signal is amplified and applied through the diode 318 and the resistor 320 to a second summing junction 322 whose second input current is provided by the transistor 332. In the circuit thus far described, all components have operated through the capacitor 272 which filters the pulsating D.C. to a very low ripple D.C. current.

A clipped, pulsating current having a frequency twice that of the A.C. line is applied to the reset circuit comprising the transistors 324 and 332; the resistors 326, 328, 330, 331, 336, 338, and 342; the diodes 340 and 334; and the Zener diodes 329 and 343. During an early part of an A.C. cycle the transistors 324 and 332 are turned on for discharging the capacitor 346. As the clipped full wave signal applied to the resistor 331 increases the transistors 324 and 332 are cut off thereby allowing the capacitor 346 to charge from the transistor 308 through the diode 318 and resistor 320 and through the resistors 338 and 342. Capacitor 334 is reset to the firing voltage of the Zener diode 343 during the early part of the cycle when the transistors 324 and 332 are conductive.

The anode of a diode 362 is connected to the summing junction 322 while the cathode thereof is connected to the positive potential line 370 through a resistor 364 and connected to the reference potential line 258 through a capacitor 366. The diode 362, resistor 364, and capacitor 366 provide a time delay to keep the capacitor 346 discharged until the capacitor 294 charges during the period that power is initially applied to the circuit. This prevents motor power and rotational surge within the motor 86 when power is initially applied thereto.

When the capacitor 346 is allowed to charge to the firing point of the unijunction transistor 348, a pulse is applied to the transformer 352 and delivered to the control electrodes of the silicon controlled rectifiers 354 and 358. The point during the cycle at which the pulse is applied governs the firing angle of the silicon controlled rectifiers and applies an armature voltage across the motor 86 which, in turn, controls the armature speed. A free-wheeling diode 368 is connected between the reference potential line 258 and the junction 356 for suppressing an inductive pulse during the switching of the silicon controlled rectifiers 354 and 358.

Figure 8:
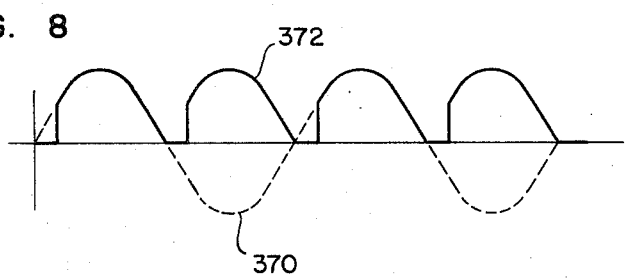
FIG. 8 is a curve showing the input signal which is applied to the motor within the drive mechanism of FIG. 7.

The resulting wave form across the motor armature 86 may be seen in FIG. 8. The A.C. line voltage is represented by the curve 370, while the voltage applied across the motor armature is represented by the stepped curve 372.

One of the unique features of the present invention which allows the high frequency input signal to be continuously recorded and immediately displayed upon the recording medium 22 is the utilization of the automatic intensity amplifier 208 for amplifying the vertical portion of the high frequency input signal applied to the input terminal 174. As recording takes place, the changing input signal will cause a change in the velocity component of both the electron beam, on the inner surface of the face plate 30, and the recording spot, on the outer surface of the face plate 30, which forms the recording trace upon the recording medium 22. The velocity of the electron beam, in transverse recording, includes the velocity component of the horizontal sweep; while the velocity of the recording spot, forming the recording trace, includes the velocity component of the sweep plus the component of the longitudinal motion of the recording medium. Due to the plurality of velocity components, the exposure of the recording medium 22, when the electron beam current is constant, will vary over a wide range. Thus, the high electron beam current required to form a recording spot for recording a high frequency input signal may damage the inner surface of the face plate 30, due to excess power dissipation, during periods of low frequency inputs when the recording spot is substantially motionless. Therefore, compensation is required to insure high frequency recording and to insure that the fiber-optics cathode-ray tube 20 will not be damaged in the absence of a high frequency input signal. Exact compensation is not convenient since the velocity relative to the recording medium is a function of several variables. For most instances, when the velocity component of the input signal is substantially greater than the velocity component of the beam sweep or the velocity component of the recording medium motion, compensation may be made by varying the electron beam current depending only on the rate of change of the input signal. This is the situation in the high frequency recording apparatus of the present invention. Therefore, unlike prior art devices, it is desirable in the present invention to increase the electron beam current and the intensity of the recording spot formed thereby in direct proportion to the input signal variations. The present invention goes one step further, however, and provides a means for increasing the electron beam current as a function of the velocity component of the beam sweep. As the transverse sweep rate is fixed by the adjustment of the sweep timing switch 146, the electron beam current may be nominally increased each time the sweep rate is adjusted upward. This will be described hereinbelow.

Referring to FIG. 9 the details of the internal trigger amplifier 188 and the automatic intensity amplifier 208 are shown. The vertical preamplifier 178 includes a first stage wherein the vertical input signal is differentially amplified. The output from each side of this differential amplifier is applied to the input of a second differential amplifier which is, in turn, applied to the internal trigger amplifier 188 and also applied to the second stage of the vertical preamplifier. The vertical preamplifier may be of several circuits commercially available and will not be described herein. The signal from the vertical preamplifier 178 is attenuated through a pair of resistors 374 and 376 to emitter follower transistors 378 and 380 within the internal trigger amplifier 188. The emitters of transistors 378 and 380 are commonly clamped to a source of negative reference potential at a terminal 382 through a pair of identical biasing resistors 384 and 386. The node between the resistors 384 and 386, to which the negative potential from the terminal 382 is connected, connects to the wiper arm of a potentionmeter 388. Each end of the slidewire of the potentiometer 388 is connected through a pair of resistors 390 to the emitter of second pair of transistors 392 and 394. The emitters of the transistors 392 and 394 are serially connected through a resistor 396, while their collectors are connected through identical biasing resistors 398 to a source of positive potential at terminals 400 and 402. The collectors of the transistors 378 and 380 are also connected to the source of positive potential supplied from the terminals 400 and 402. The collector of the transistor 392 is connected to the base of a PNP transistor 404 having its emitter connected through biasing resistor 406 to the terminal 400 and its collector connected through a second biasing resistor 408 to a source of negative potential at a terminal 410. The collector of the transistor 404 is also connected to a trigger amplifier within the sweep generator 190.

The output of the internal trigger amplifier 188 is provided from the collectors of the transistors 392 and 394 to the base members of transistors 412 and 414 within the automatic intensity amplifier 208. The collectors of the transistors 412 and 414 are connected through identical biasing resistors 416 and 418 to a source of positive potential provided at terminals 420 and 422, respectively. The emitters of the transistors 412 and 414 are connected through a resistor 424 to each other while being connected through a pair of biasing resistors 426 to a source of negative potential provided at a terminal 428. The collectors of the transistors 412 and 414 are also connected to the bases of a pair of transistors 430 and 432 whose collectors are connected to the terminals 420 and 422. The emitters of the transistors 430 and 432 are connected through a pair of resistors 434 to ground and are also connected through a pair of capacitors 436 to the base of a pair of PNP transistors 438 and 440. The bases of the transistors 438 and 440 are connected through a second set of resistors 442 to a common ground with the emitters of the transistors 430 and 432. The collectors of transistors 438 and 440 are connected through a pair of biasing resistors 444 to a source of negative potential provided at a pair of terminals 446 and 448. The emitters of the transistors 438 and 440 are separated by a resistor 450 and also connected through a pair of biasing resistors 452 to a source of positive potential provided at a terminal 454. The transistors 438 and 440 are connected through their collectors to the bases of a final pair of transistors 456 and 458. Transistors 456 and 458 are connected through their collectors to the terminals 446 and 448, while their emitters are commonly connected through biasing resistors 460 to ground. The output of the automatic intensity amplifier 208 is provided from the emitters of the transistors 456 and 458 which are connected to the cathodes of a pair of diodes 462 having their anodes commonly connected through biasing resistors 460 to ground. The anode junction of the diodes 462 is connected through an attenuating resistor 464 to the blanking amplifier 210 before being applied to the fiber-optics cathode-ray tube 20.

In operation, the internal trigger amplifier 188 includes two emitter followers formed from transistors 378 and 380 which apply an input signal into a differential amplifier stage formed from transistors 392 and 394. The output from the transistors 392 and 394 is single-ended through a buffered stage, formed by the transistor 404, to the trigger amplifier of the sweep generator circuit 190. The output from the differential amplifier stage 392 and 394 is also directly coupled to the first stage of the automatic intensity amplifier 208. As mentioned hereinabove, the input signal to the internal trigger amplifier, derived from the vertical preamplifier, is balanced by the adjustment of the potentiometer 388 between the transistors 392 and 394. The first stage of the automatic intensity amplifier is formed from transistors 412 and 414 which are in differential amplifier arrangement. The transistors 430 and 432 provide low impedance to the differential network which consists of the capacitor pair 436 and resistive pair 442. The output of the network is amplified and the positive signals are clipped by the transistors 438 and 440. The transistors 456 and 458 provide a low impedance output stage for the automatic intensity circuit to the blanking amplifier 210.

The sweep generator 190 is also connected to the input of the blanking amplifier 210 through an adjustable resistive network 466. As described hereinabove, a signal from the sweep generator 190 provides the input to the blanking amplifier which, in turn, blanks the fiber-optics cathode-ray tube 20 during the flyback of the electron beam. The adjustable resistive network is controlled by the sweep timing switch 146 for attenuating the signal applied to the blanking amplifier 210 during the transverse sweep of the electron beam. Therefore, as the transverse sweep rate is increased, the adjustable resistive network serves to increase the nominal electron beam current within the fiber-optics cathode-ray tube 20.

In the preferred embodiment thus described, the recording apparatus 10 utilizes the fiber-optics cathode-ray tube 20 to form a recording trace 126 upon the recording medium 22 which is ultrasensitive to a predetermined wavelength of electromagnetic energy. The inner surface of the face plate associated with the fiber-optics cathode-ray tube 20 is coated with a phosphor which has been selected for its emission of wavelengths equalling those to which the recording medium 22 is ultransensitive. As the recording medium 22 is drawn past the face plate 30 of the fiber-optics cathode-ray tube, the speed at which the recording medium 22 is being drawn therepast is sensed by the pair of tachometers 96 and 98. The voltage produced by the tachometer 98 is applied to the skew correction 108 for offsetting, or skewing, the input signal as it is transversely swept across the face plate of the fiber-optics cathode-ray tube 20. Through this correction the resultant recording trace 126 is always retained normal to the longitudinal motion of the recording medium 22. The voltage produced by the tachometer 96 provides a reference signal to the drive servo circuitry 106 for correcting the speed of the motor 86.

When recording, an input signal applied to the input terminal 174 can be attenuated through the attenuation circuit 176 or directly applied to the vertical preamplifier 178. This signal is amplified and applied through the summing junction 180 to the vertical deflection amplifier 182 which controls the vertical deflection plates 184. The output of the vertical preamplifier 178 is also applied to the internal trigger amplifier 188 which amplifies these signals further before they are applied to the sweep generator 190 and the automatic intensity amplifier 208. The signal from the automatic intensity amplifier is applied to the blanking amplifier 210 which also receives an adjustable signal from the sweep generator 190. The output of the blanking amplifier 210 is applied to the control grid 212 for increasing the intensity of the electron beam, as it strikes the internal surface of the face plate 30, in direct proportion to the changing potential of the input signal at the input terminal 174. A signal from the sweep generator 190, applied to the blanking amplifier 210, functions to nominally increase the intensity of the electron beam in proportion to its transverse sweep rate and prevents the electron beam from striking the inner surface of the face plate during the flyback sweep of the beam. The sweep generator circuit 190 can also provide a signal to the automatic start-stop circuitry 206 for starting the motor 86, controlled by the drive servo 106, when an input signal is applied to the input terminal 174. As illustrated in FIG. 4 by the line connecting the drive servo circuitry 106 to the skew correction circuitry 108, the driving motion provided by the motor 86 is applied to the skew correction circuit 108 in the form of a variable potential directly proportional to the instantaneous velocity of the recording medium. The skew correction circuitry 108 utilizes the voltage applied thereto from the tachometer 98 to ultimately provide a current to the summing junction 180 for deflecting the input signal. The sweep generator 190 is also connected to the skew correction circuitry 108 for removing the skew correcting current from the summing junction 180 during the flyback sweep of the electron beam. The sweep generator further provides an output to the horizontal deflection amplifier 192 which controls the horizontal deflection plates 194; and it also provides a signal to the blanking amplifiers 210 and 214 associated with the fiber-optics cathode-ray tube 20 and the monitoring cathode-ray tube 128, respectively.

Due to the unique arrangement of the transverse recording trace 126 upon a face of the cathode-ray tube, the electron beam and the recording spot which form the trace need not retrace the same path on the phosphor lining the inner surface of the face plate. This free running arrangement protects the phosphor from over exposure and damage as the electron beam is repeatedly swept across the face plate. Therefore, the intensity of the electron beam may be increased initially without causing damage to the phosphor coating on the inner surface of the face plate. With an increased intensity available at the recording spot, higher input frequencies may thereby be recorded. Secondly, through the unique arrangement of the automatic intensity amplifier 208, which increases the intensity of the recording electron beam only upon the occurrence of a change in input signal, the speed of the recording trace may be increased still further. Thirdly, the nominal intensity of the electron beam is increased in proportion with an increase of the adustable transverse sweep rate thereof. Due to the precise spectral match between the cathodoluminescence of the phosphor and the recording medium which is ultrasensitive to the wavelengths of the electromagnetic radiation emitted thereby, the increased intensity of the electron beam may be fully utilized to provide for an increased velocity of the recording trace and an increase in the relative velocity of the recording medium. Finally, the efficient coupling of the electromagnetic radiation from the phosphor to the recording medium through the fiber-optic bundles within the face plate of the cathode-ray tube provides for the final improvement in the recording of a high frequency input signal. Through this unique combination, therefore, a high speed recording apparatus has been provided which is capable of continuously recording and immediately displaying a high frequency input signal transversely upon the recording medium.

While the present invention has been described with relation to transverse recording, it should be understood that the apparatus is equally adaptable for continuously recording the high frequency input signal along the longitudinal axis of the recording medium.

The embodiments of the invention in which an exclusive property or privilege is claimed are defined as follows:

1. A recording apparatus for continuously recording and immediately displaying a high frequency input signal comprising, a cathode-ray tube arranged for generating an electron beam having a face plate embedded with fiber-optic bundles across the entire surface thereof and passing therethrough, said cathode-ray tube arranged for transmitting invisible radiation having a high concentration of a predetermined wavelength through said fiber-optic bundles when said electron beam strikes the inner surface of said face plate in response to said high frequency input signal, a recording medium substantially insensitive to most visible radiation and spectrally matched to be ultrasensitive to said predetermined wavelength of invisible radiation transmitted from said cathode-ray tube, a platen pivotally arranged to cover said face plate, pressure means mounted on said platen for slidably pressing said recording medium against said face plate surface, idler roller means mounted on said platen over which said recording medium is past while exiting from between said pressure means and said face plate, drive roller means arranged to engage said idler roller means when said platen is pivoted into a closed position covering said face plate, driving means, and means connecting said driving means to drive said drive roller means for drawing said recording medium past said face plate surface, whereby said predetermined wavelength of invisible radiation passing through said fiber-optic bundles exposes said recording medium for immediately and continuously forming a recording trace thereon in response to said high frequency input signal.

2. A recording apparatus for continuously recording and immediately displaying high frequency input signals comprising a fiber-optics cathode-ray tube having a face plate with fiber-optic bundles embedded within the full surface thereof, said cathode-ray tube arranged for generating an electron beam which strikes the inner surface of said face plate for transmitting radiation having a high concentration of a predetermined wavelength through said fiber-optic bundles therein, a recording medium arranged to be drawn continuously past the face plate of said cathode-ray tube for receiving said transmitted radiation, said recording medium spectrally matched to be ultrasensitive to the concentration of said predetermined wavelength within said transmitted radiation, sweep means arranged to sweep said electron beam in response to said high frequency input signals across said face plate transverse to said recording medium as said medium is continuously drawn thereby, first amplifying means operative to receive said high frequency input signals and apply a resulting signal to said cathode-ray tube for vertically deflecting said electron beam from the transverse sweep thereof in response to said input signals, second amplifying means for receiving said high frequency input signals and applying an amplified signal to said cathode-ray tube for increasing the intensity of said electron beam and said transmitted radiation produced thereby in proportion to the velocity of the vertical deflection of said electron beam caused by said first amplifying means, whereby said transmitted radiation passing through said fiber-optic bundles within said face plate is increased during the vertical deflection of said electron beam for increasing the exposure of said recording medium during the presence of said input signals to improve the recording of said high frequency input signals thereon.

3. An oscillographic recording apparatus for continuously recording and immediately displaying high frequency input signals comprising, a cathode-ray tube having a face plate fully embedded with fiber-optic bundles at right angles to the surface thereof, a recording medium substantially insensitive to most electromagnetic radiation and ultrasensitive to a predetermined wavelength of invisible radiation, said cathode-ray tube arranged for generating an electron beam which strikes the inner surface of said face plate, said face plate of said cathode-ray tube having an inner surface coated with a material specifically chosen for emission of a predetermined wavelength of invisible radiation which spectrally matches the sensitivity of said recording medium, means for retaining said recording medium in a slidable friction contact against the outer surface of said face plate, means for continuously drawing said recording medium slidably past the outer surface of said face plate, input means for receiving said high frequency input signals, sweep means arranged to be triggered by said high frequency input signals for generating the deflection of said electron beam transversely across the face plate of said cathode-ray tube, vertical amplifying means operative for receiving said high frequency input signals from said input means and applying a resulting signal to said cathode-ray tube thereby vertically deflecting said transversely swept electron beam, second amplifying means operative for receiving said high frequency input signals from said input means and applying a second signal to said cathode-ray tube for increasing the intensity of said electron beam in proportion to said vertical deflection thereof caused by said vertical amplifying means, whereby a transverse recording trace is continuously formed upon said recording medium in response to said high frequency input signals as said medium is drawn past the face plate of said cathode-ray tube.

4. An oscillographic recording apparatus for recording high frequency input signals as claimed in claim 3 wherein said input means includes input terminal means, attenuating means connected to said input terminal means, and preamplifying means connected to said attenuating means; said second amplifying means includes an internal trigger amplifying means connected to preamplifying means and automatic intensity amplifying means connected between said internal trigger amplifying means and said fiber-optics cathode-ray tube; and said sweep means includes a sweep generator means connected to said internal trigger amplifying means and a horizontal amplifying means connected between said sweep generator means and said fiber-optics cathode-ray tube.

5. An oscillographic recording apparatus for recording high frequency input signals as claimed in claim 4 wherein said internal trigger amplifying means includes first and second transistor means connected in an emitter follower relationship and a differential amplifier stage connected to said first and second transistor means having an output therefrom connected to said automatic intensity amplifying means; and said automatic intensity amplifying means includes a first stage differential amplifier means, a differential impedance network, transistorized low impedance means connecting said first stage differential amplifier means to said differential impedance network, a second stage differential amplifying means connected to said impedance network, and transistorized low impedance means for receiving a signal from said second stage amplifying means and applying said signal to said fiber-optics cathode-ray tube.

6. An oscillographic recording apparatus for recording high frequency input signals as claimed in claim 3 additionally comprising skew correction means connected to and triggered by said sweep means, means for sensing the velocity of said recording medium and applying a proportional signal to said skew correction means, and means connecting said skew correction means to said vertical amplifying means for applying a proportional skew correction signal thereto for retaining said transverse recording trace normal to the continuous motion of said recording medium as it is drawn past the face plate of said cathode-ray tube.

7. An oscillographic recording apparatus for recording high frequency input signals as claimed in claim 6 wherein said skew correction means includes an amplifier having a capacitance feedback network, means for shorting said capacitance network to provide a sawtooth output signal from said skew correction means, said means for sensing the velocity of said recording medium including tachometer means driven by said means for drawing said recording means past said face plate, adjustable resistive means connected between said tachometer means and said last mentioned amplifier for varying said sawtooth output signal from said skew correction means, and said means connecting said skew correction means to said vertical amplifying means include a summing junction for receiving said sawtooth output signal and said high frequency input signal from said input means, whereby a recording trace is formed upon said recording medium in normal relationship to the longitudinal motion thereof regardless of the velocity of said recording.

8. An oscillographic recording apparatus as claimed in claim 3 wherein said recording medium experience its maximum sensitivity to electromagnetic radiation at 3850 angstroms and the material coating the inner surface of the face plate of said cathode-ray tube emits an electromagnetic radiation having a maximum concentration at 3850 angstroms for forming a spectral match therebetween and increasing the recording efficiency of said recording apparatus.

9. An oscillographic recording apparatus for continuously recording and immediately displaying high frequency input signals comprising a fiber-optics cathode-ray tube arranged to emit a concentration of a predetermined wavelength of electromagnetic radiation through a face plate thereof in response to said high frequency input signal applied thereto, a recording medium arranged to be drawn continuously past the face plate of said fiber-optics cathode-ray tube, skew correction means arranged to transversely displace said emitted wavelength of electromagnetic radiation upon the face plate of said fiber-optics cathode-ray tube in response to the instantaneous velocity of said recording medium drawn therepast such that said emitted wavelength of electromagnetic radiation need not retrace itself for permitting an initial increase in the intensity thereof, amplifying means operably connected to said fiber-optics cathode-ray tube for receiving said high frequency input signal and arranged for providing a second intensity increase of said emitted wavelength of electromagnetic radiation in response to said high frequency input signal applied thereto, and said recording medium spectrally matched to be ultrasensitive to the emitted wavelength of electromagnetic radiation through the face plate of said fiber-optics cathode-ray tube for providing full utilization of the increased intensity of said emitted wavelength to record said high frequency input signal.

10. An oscillographic recording apparatus as claimed in claim 9 wherein said skew correction means includes sweep generator means associated therewith for establishing an adjustable transverse sweep rate of said emitted wavelength of electromagnetic radiation and impedance means connecting said sweep generator means to said fiber-optics cathode-ray tube for nominally increasing the intensity of said emitted wavelength of electromagnetic radiation as said transverse sweep rate is increased.

References Cited
UNITED STATES PATENTS

| | | | |
|---|---|---|---|
| 2,091,152 | 8/1937 | Malpica | 346—110 |
| 2,681,382 | 6/1954 | Hilburn | 178—6.7 |
| 2,965,434 | 12/1960 | Downs | 346—110 |
| 3,110,764 | 11/1963 | Barry | 346—110 X |
| 3,137,768 | 6/1964 | Mullin | 178—6.6 |
| 3,184,753 | 5/1965 | Koster | 346—110 |
| 3,339,543 | 9/1967 | Richard | 128—2.06 |

RICHARD B. WILKINSON, *Primary Examiner.*

JOSEPH W. HARTARY, *Assistant Examiner.*

U.S. Cl. X.R.

315—22; 178—6.7